United States Patent [19]

Benchoff

[11] Patent Number: 5,069,498

[45] Date of Patent: Dec. 3, 1991

[54] PICKUP TRUCK RETRACTABLE ENDGATE AIR FOIL

[76] Inventor: Larry J. Benchoff, 315 Geiser Ave., Waynesboro, Pa. 17268

[21] Appl. No.: 571,167

[22] Filed: Aug. 22, 1990

[51] Int. Cl.$^5$ .............................................. B62D 35/00
[52] U.S. Cl. ................................. 296/180.1; 296/37.6
[58] Field of Search ................... 296/180.1, 50, 57.1, 296/37.6

[56] References Cited

U.S. PATENT DOCUMENTS

| | | | |
|---|---|---|---|
| 4,451,075 | 5/1984 | Canfield | 296/180.1 |
| 4,506,870 | 3/1985 | Penn | 296/180.1 |
| 4,585,263 | 4/1986 | Hesner | 296/180.1 |
| 4,884,838 | 12/1989 | Slater | 296/180.1 |

*Primary Examiner*—Robert R. Song

[57] ABSTRACT

The present invention, an extendable, retractable endgate air foil, is a device for deflecting the flow of air through the bed (7) of a pickup truck or car up and over the endgate (1). The device includes rigid, overlapping panels (5) (10), which direct the air flow from the lower floor of the bed (7) over the inclined panels stretching from the wheelwells (9) to the top of the endgate (1) in order to reduce air drag on the otherwise upright, closed endgate. The air foil panels (5) (10) will also retract upwardly and rearwardly for pinning onto the bottom of the vehicle's endgate (1) in order to maximize load capacity in keeping with the intended purpose of the conventional truck bed and rear-end tailgate.

4 Claims, 2 Drawing Sheets

PICKUP TRUCK RETRACTABLE ENDGATE AIR FOIL

BACKGROUND OF THE INVENTION

The present invention is a retractable endgate air foil for a pickup truck or car which includes a plate permanently attached to the endgate connected to a hinge at the very top of the endgate with rigid overlapping telescopic panels connected to the other side of the hinge that allows for downward and forward positioning to be pinned at the base of the wheelwell to serve as the aforementioned air foil. This structure provides an inclined surface that deflects air flowing through the bed of a pickup truck or car up and over the endgate of the vehicle thereby reducing air drag, increasing mileage, and enhancing the rear stability of the vehicle. When the overlapping, telescopic panels are unpinned from the wheelwell base, and moved upwardly and rearwardly towards the endgate and are pinned at the bottom of the endgate, the air foil is neutralized and the pickup truck bed returns to its normal operation and design contour.

INFORMATION DISCLOSURE STATEMENT

Various attachments have been provided for pickup trucks including loading ramps, netted-type tailgates for reducing air drag and various inclined panels between the sides of the truck bed and the endgate. The following U.S. Pat. Nos. are relevant to this invention but do not disclose the same or equivalent structure.

4,884,838
4,585,263
4,506,870
4,451,075

SUMMARY OF THE INVENTION

The present invention generally relates to an extendable, retractable endgate air foil for a pickup truck or car fastened by a panel screwed to a pivotal endgate that can be moved to either an upward, closed position, or a downward, rearward, open position.

It is an object of the present invention to provide a flexible, two-position air foil that can be easily and quickly moved and pinned to an air foil or a full load position.

Another object of the invention is to be thinly and rigidly constructed so as to provide an extended air foil but to stow away (retract) to an inconspicuous profile in the vehicle bed.

Still another objective is to use the air foil to reduce wind resistance and air drag and therefore provide increased fuel mileage and at the same time create downforce on the rear wheels for better driving stability.

Another objective of this invention is to provide storage beneath the extended air foil to keep articles concealed and under cover from the outside elements. An optional lock could be employed for security.

A final objective of this invention is to allow for normal opening and closing of the endgate without interference from the air foil, brought about by the retracting position of the telescopic panels being pinned to the bottom of the endgate. The prior art in general, and none of the present invention in the cited references, disclose the present invention which has a retractable air foil (4,5,10) that pins (6) to the endgate (1) so that full operation of the endgate can take place while the air foil is attached thereto; and in a timely manner can then quickly and easily be extended back to the full air foil effect by means of the hinge movement (3) and pinned into that position (6).

DETAILED DESCRIPTION OF THE PREFERRED EMBODIMENTS

Figure 1:
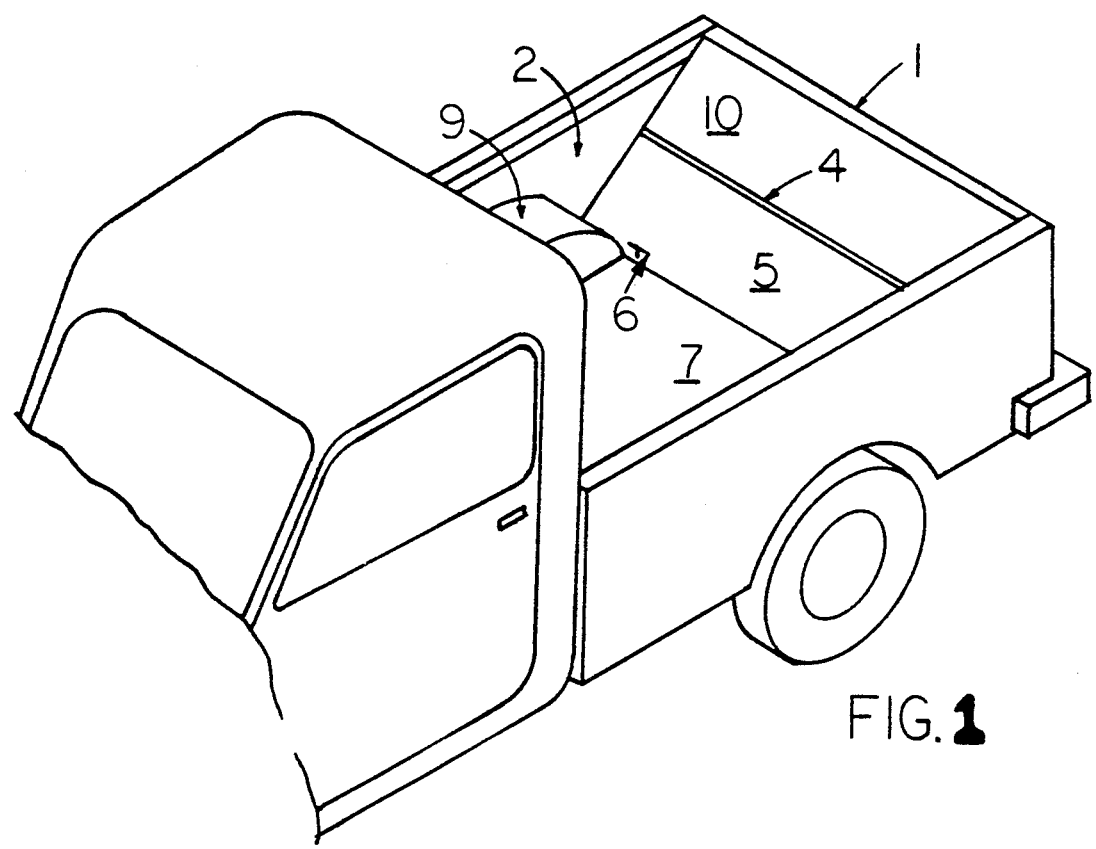
FIG. 1 is a side elevation of a pickup truck with the retractable endgate air foil extended from the top of the endgate to the wheelwells.

Referring specifically to the drawings, the retractable endgate air foil of the present invention is generally designated by reference numerals 5 and 10 and is installed on a pickup truck endgate 1 as shown in FIG. 1. Numeral 7 is the floor of the truck bed and numeral 2 is the sidewall of the truck bed, with 9 being the wheelwell in a conventional pickup truck or pickup car. Numeral 4 is the telescopic joint between the top and bottom panels of the air foil, while numeral 6 is a pin used to fasten the bottom of the air foil panel to either the bed of the truck 7 or the bottom of the endgate 1.

Figure 2:
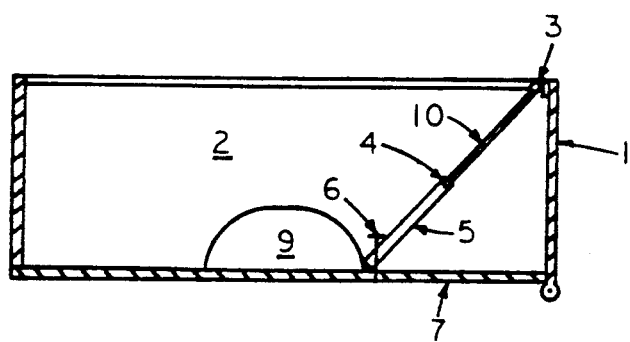
FIG. 2 is a side view of the pickup bed showing the fully extended, telescoping, endgate air foil, pinned at the base of the wheelwells.

FIG. 2 is a side view of the truck bed looking in from the driver's side to depict the fully extended air foil from the top of the endgate 1, connected by a hinge 3, to the base of the wheelwell 9, and pinned 6 to the floor of the bed 7. The top panel 10 and the bottom panel 5 are fully extended at the telescopic joint 4 to reach the base of the wheelwells 9. The angle of the air foil against the side of the truck bed 2 shows the inclined effect of the air deflector over the endgate of the pickup bed, thus cutting down the air drag on he conventional upright endgate that is perpendicular to the truck bed.

Figure 3:
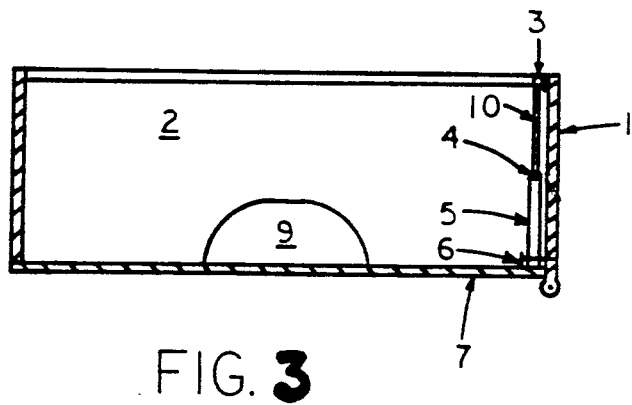
FIG. 3 is a side view of the pickup bed showing the retracted endgate air foil, pinned to the bottom of the endgate.

FIG. 3 is also a side view of the truck bed looking again from the driver's side to depict the retracted air foil where the panels 5 and 10 are overlapped into a tucked position and fastened to the bottom of the endgate 1 via the pin(s) 6. The hinge 3 at the top of the endgate 1 and the telescopic joint 4 permits the flat tucked away position shown in the figures. This feature of the invention is unique in that both the air foil effect and the tucked away full-load position are possible, and both are desirable positions.

Figure 4:
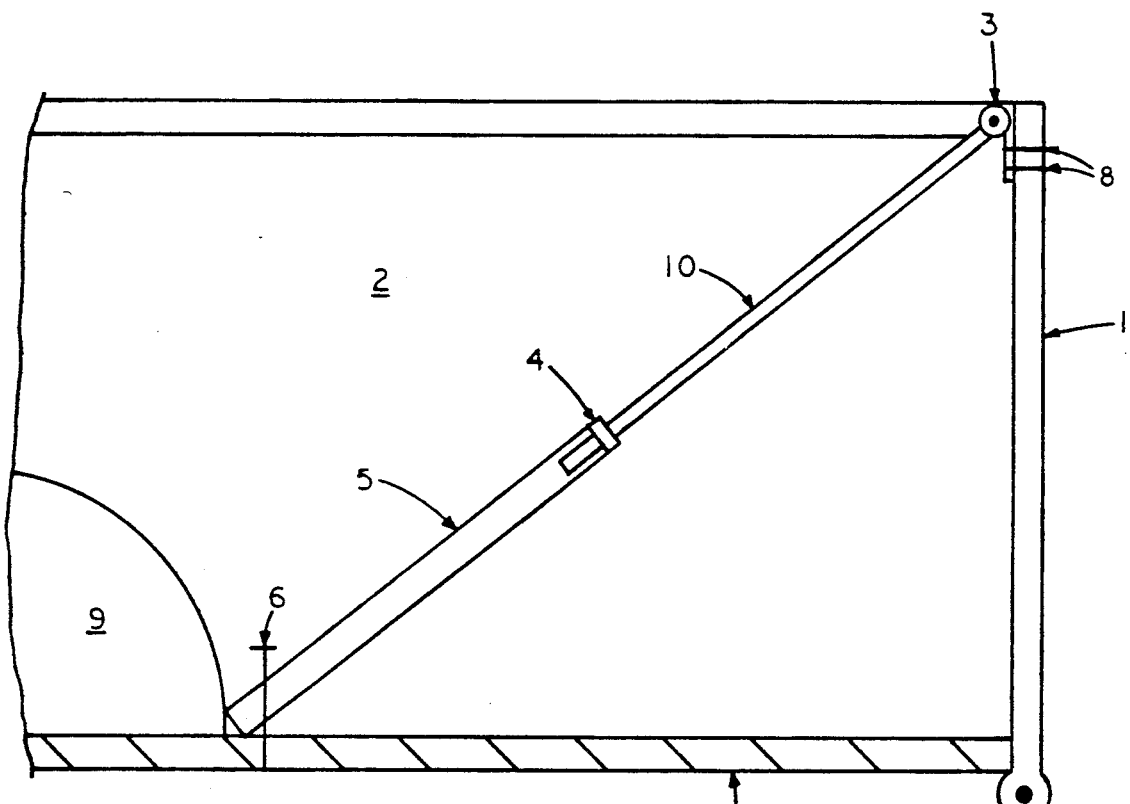
FIG. 4 is an enlarged cutaway of FIG. 2 for added clarity.

FIG. 4 is an enlargement of FIG. 2, but is necessary to show the fastening of the hinge 3 to the truck bed endgate 1 by screws or other fastening techniques, to become an integral and permanent part of the endgate. Again, the figure shows the fully extended endgate air foil for maximum fuel economy brought about by reduced air drag over the endgate. Fully exposed panels 5 and 10 are the deflector surfaces to direct the flow of air from the base of the truck bed 7 through the incline of the foil and over the endgate 1 at the highest point of the endgate at hinge 3.

Figure 5:
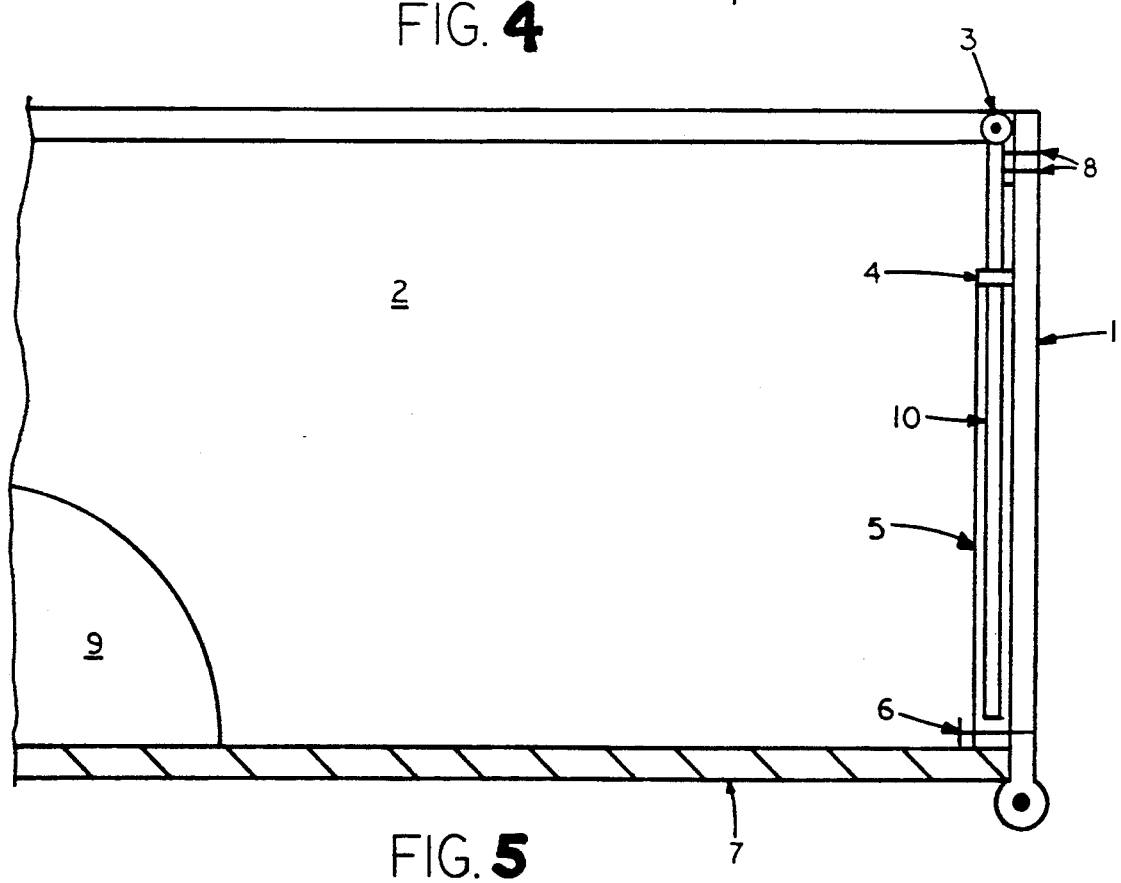
FIG. 5 is an enlarged cutaway of FIG. 3, also for added clarity.

FIG. 5 is an enlargement of figure 3 showing the same characteristic numerals as figure 4, but demonstrating the retracted endgate air foil in the tucked away position for maximum load capacity, physically allowing for the primary load intent of a conventional pickup truck. This view asserts the requirement that the profile of the air foil panels 5 and 10 be as thin and inconspicuous as possible for both maximum functionality and aesthetics as close to the original pickup design as strength and durability will permit. The figure clearly shows the overlap of surface panels 5 and 10 to hug the profile of the endgate 1 surface as closely as possible so as not to protrude and to detract from the load capacity.

The foregoing is considered as illustrative only of the principles of the invention. Further, since numerous modifications and changes will readily occur to those skilled in the art of fabrication, it is not desired to limit the invention to the exact construction and operation shown and described, and, accordingly, all suitable modifications and equivalents may be resorted to, falling within the scope of the invention. An example of this point is the potential fastening of hinge 3 to the endgate 1 at the very apex or highest point (top) of the endgate, as compared to the inside as illustrated. This would be an optional mounting depending upon the preference of the fabricator. In the illustrated example, the hinge is not in view because it is fastened to the inside of the endgate. However, when the endgate is lowered to a flat position in line with the bed, the hinge would protrude on the surface of the endgate. An optional mounting, wherein the hinge is at the top edge of the endgate (when closed), would give the fabricator a flush endgate profile when the endgate is opened and placed in the flat position with regard to the truck bed.

What is claimed is as follows:

1. A combined extendable and retractable air foil for a pickup truck or car having an upper edge of an upper panel hingedly connected to the upper edge portion of an endgate, a lower panel telescopically slidably connected to the upper panel, the lower panel being extended from the upper panel with the lower edges of the lower panel resting against the rear portions of the wheelwells in this operative use position, the lower panel being retracted into the upper panel and resting against the inner surface of the endgate when not used as an air foil, means for maintaining the air foil in its use and non-use position.

2. The structure as defined in claim 1 wherein said maintaining means comprising at least one pin insertable through an aperture formed in a portion adjacent said lower edge and corresponding apertures formed in the truck bed and the tailgate to direct air flowing through the bed up and over the endgate to reduce air drag, increase the fuel mileage, and to create a downward force on the rear wheels for improved stability of the vehicle in its extended position.

3. The structure as defined in claim 1 wherein when said air foil is in its use position, a storage area is fully enclosed by said air foil and the side walls, the bed and the end gate of the pickup truck.

4. The structure as defined in claim 1 wherein said telescopic panels retracted and pinned at the base of the endgate to place the vehicle back to its original pickup/car bed contour for its normal hauling capability.

* * * * *